(12) United States Patent
Lee

(10) Patent No.: US 12,491,950 B2
(45) Date of Patent: Dec. 9, 2025

(54) VEHICLE SPOILER AND MANUFACTURING METHOD THEREOF

(71) Applicants: HYUNDAI MOTOR COMPANY, Seoul (KR); KIA CORPORATION, Seoul (KR)

(72) Inventor: Yong Beom Lee, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 388 days.

(21) Appl. No.: 18/136,155

(22) Filed: Apr. 18, 2023

(65) Prior Publication Data

US 2024/0092433 A1    Mar. 21, 2024

(30) Foreign Application Priority Data

Sep. 21, 2022  (KR) .................. 10-2022-0118984

(51) Int. Cl.
| | |
|---|---|
| *B29C 43/18* | (2006.01) |
| *B62D 35/00* | (2006.01) |
| *B29L 31/30* | (2006.01) |

(52) U.S. Cl.
CPC ............ *B62D 35/007* (2013.01); *B29C 43/18* (2013.01); *B29C 2043/185* (2013.01); *B29L 2031/3058* (2013.01)

(58) Field of Classification Search
CPC .... B62D 35/007; B62D 35/001; B29C 43/18; B29L 2031/3058
See application file for complete search history.

(56) References Cited

FOREIGN PATENT DOCUMENTS

| | | | | |
|---|---|---|---|---|
| DE | 10041970 A1 | * | 3/2002 | ......... B29C 45/1704 |
| JP | 2000117822 A | * | 4/2000 | |
| JP | 2021109580 A | * | 8/2021 | |
| KR | 20040097835 A | | 11/2004 | |

* cited by examiner

*Primary Examiner* — Aaron L Lembo
(74) *Attorney, Agent, or Firm* — MCDONNELL BOEHNEN HULBERT & BERGHOFF LLP (57) ABSTRACT

Disclosed herein is a vehicle spoiler, and more particularly, a vehicle spoiler with improved adhesive strength between a fixing member and a spoiler body due to a structure of the fixing member which is provided with an adhesive surface surface-treated in an embo shape and a protrusion formed to protrude at a predetermined height in a vertical direction of the adhesive surface, and a manufacturing method thereof. The vehicle spoiler includes a spoiler body installed in a vehicle trunk in a width direction and formed in a plate shape, a fixing member which is coupled to a lower surface of the spoiler body in a vertical direction and which includes an adhesive surface having one surface undergoing surface treatment and a protrusion formed to protrude at a predetermined height in a vertical direction of the adhesive surface, and an adhesive applied to the adhesive surface of the fixing member.

15 Claims, 6 Drawing Sheets

<A-A' CROSS SECTION>

<A-A' CROSS SECTION>

<B-B' CROSS SECTION>

| EXAMPLE 1 | EXAMPLE 2 | EXAMPLE 3 |
|---|---|---|
| STRAIGHT LINE | ZIGZAG | CURVED SURFACE (WAVE PATTERN) |
| — | /\/\/\/\ | ~~~~ |

VEHICLE SPOILER AND MANUFACTURING METHOD THEREOF

CROSS-REFERENCE TO RELATED APPLICATION

This application claims under 35 U.S.C. § 119(a) the benefit of priority to Korean Patent Application No. 10-2022-0118984 filed on Sep. 21, 2022, the entire contents of which are incorporated herein by reference.

BACKGROUND

(a) Technical Field

The present disclosure relates to a vehicle spoiler, and more particularly, to a vehicle spoiler with improved adhesive strength between a fixing member and a spoiler body due to a structure of the fixing member which is provided with an adhesive surface that is surface-treated in an embo shape having a plurality of uneven protrusions and a protrusion formed to protrude at a predetermined height in a vertical direction of the adhesive surface, and a manufacturing method thereof.

(b) Background Art

A spoiler achieves stability during high-speed driving by suppressing a phenomenon in which a vehicle body is floated due to an airflow formed when a vehicle is traveling at high speed. Recently, a variable spoiler is applied to a vehicle, wherein a structure is provided in which the spoiler is drawn out from a rear trunk portion of the vehicle when the spoiler is needed, and the spoiler is stored when the spoiler is not needed.

Generally, the vehicle spoiler includes a hollow spoiler body installed in the form of extending from a rear side of the vehicle in a width direction of a trunk lid, and a plurality of fixing members vertically fixed to a lower surface of the hollow type spoiler body and configured to fix the hollow type spoiler body by spacing the hollow type spoiler body from an upper surface of the trunk lid by a predetermined distance.

The conventional hollow type spoiler is manufactured using a blow molding method. The blow molding method manufactures a hollow type spoiler body corresponding to a cavity of a mold by placing a parison made of thermoplastic in the mold including a moving plate and a fixed plate, coupling the mold, injecting hot air into the parison to inflate the parison, and cooling the parison while injecting cold air into the parison. The spoiler body is formed as a hollow shape so as to be light while maintaining a predetermined strength and a predetermined shape. In addition, in order to be light while maintaining a predetermined strength and a predetermined shape, the fixing member includes a cup-shaped fixing member body having a bottom surface formed at a lower end, and a flange extending from an upper end of the fixing member body by a predetermined length in a lateral direction.

Therefore, the conventional spoiler is manufactured such that the fixing member is integrally fixed to a lower portion of the spoiler body by fusing the fixing member to the parison in a molten state.

Due to the above conventional process, the spoiler has a problem in that micro-gaps are formed entirely or partially along an edge of a fixing member flange, and a bonding force between the spoiler body and the fixing member is weak. This is because since the fixing member should be formed in a predetermined thickness or more so as to secure a sufficient supporting force whereas air blowing is performed in a relatively short time, heat transmitted from the parison is not transmitted to an end portion of the edge of the fixing member flange so that a fusion failure occurs in a lower portion of the fixing member flange.

Therefore, the spoiler has a problem of causing a paint defect due to generation of air bubbles during painting, resulting from micro-gaps on the edge of the fixing member flange, which are generated due to the above fusion defect, and since a separate process is added to remove the paint defect, the spoiler has a problem in that a manufacturing cost increases and quality of a product is degraded.

In addition, since the blow molding method can perform molding only with limited materials, it is difficult to secure rigidity and strength of parts required when a vehicle is traveling.

Therefore, under the above background, there is a demand for the development of a vehicle spoiler manufacturing process capable of reducing defects due to occurrence of micro-gaps and fusion defects, simplifying a production process, and securing quality.

SUMMARY

The present disclosure has been made in an effort to solve the above-described problems associated with prior art.

In one aspect, the present disclosure provides a vehicle spoiler capable of strengthening a bonding force between a spoiler body and a fixing member, simplifying a production process, and securing quality, and a manufacturing method thereof.

Objectives of the present disclosure are not limited to the above-described objectives. The objectives of the present disclosure will become more apparent from the following description and will be implemented by the means described in the appended claims and a combination thereof.

In an exemplary embodiment, the present disclosure provides a vehicle spoiler including a spoiler body installed in a vehicle trunk in a width direction and formed in a plate shape, a fixing member which is coupled to a lower surface of the spoiler body in a vertical direction and which includes an adhesive surface having one surface undergoing surface treatment and a protrusion formed to protrude at a predetermined height in a vertical direction of the adhesive surface, and an adhesive applied to the adhesive surface of the fixing member.

The fixing member may have a curved plate shape of which height is gradually lowered toward both sides from a central axis.

The adhesive surface may be surface-treated in an embo shape.

The protrusion may be formed to protrude from an edge of the adhesive surface to prevent the applied adhesive from overflowing from the adhesive surface.

The protrusion may protrude in a continuously curved shape.

A protruding height of the protrusion may range from 0.4 mm to 0.8 mm.

The fixing member may further include a groove formed to be recessed by extending in a length direction of the adhesive surface.

The fixing member may further include a pair of bracket connectors formed to be recessed by extending in a length direction of the adhesive surface.

The adhesive may be applied at a height of the protrusion.

The adhesive may include at least one selected from the group consisting of polyurethane, epoxy, and a combination thereof.

In another exemplary embodiment, the present disclosure provides a method of manufacturing a vehicle spoiler, which includes preparing a spoiler body installed in a vehicle trunk in a width direction and formed in a plate shape, forming a fixing member which is coupled to a lower surface of the spoiler body in a vertical direction and which includes an adhesive surface having one surface undergoing surface treatment and a protrusion formed to protrude at a predetermined height in a vertical direction of the adhesive surface, and applying an adhesive to the adhesive surface of the fixing member and coupling the spoiler body to the fixing member.

The forming of the fixing member may include placing a molding material on a corroded lower mold, and pressing the molding material using an upper mold.

The forming of the fixing member may be performed such that a temperature of the upper mold may be set to 147° C. to 153° C., and a temperature of the lower mold may be set to 132° C. to 138° C.

The forming of the fixing member may be performed under a pressure of 650 to 750 tons for three to five minutes.

The forming of the fixing member may use the molding material having a weight of 0.92 to 0.95 kg.

The forming of the fixing member may be performed such that the adhesive surface of the molding material may be surface-treated in an emboss shape, having rounded edges, using a corroded lower mold.

In the coupling of the spoiler body to the fixing member, the adhesive may be applied at a height of the protrusion.

Other aspects and preferred embodiments of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The above and other objectives, features, and advantages of the present disclosure will become more apparent from the following description of preferred embodiments with reference to the accompanying drawings. However, the present disclosure is not limited to the embodiments disclosed herein and may be implemented in other forms. The embodiments disclosed herein will be provided to make this disclosure thorough and complete, and will fully convey the spirit of the present disclosure to those skilled in the art.

In describing each drawing, similar reference numerals are assigned similar components. In the accompanying drawings, dimensions of structures are shown in an enlarged scale for clarity of the present disclosure. Although terms "first," "second," and the like may be used herein to describe various components, these components should not be limited to these terms. The terms are used only for the purpose of distinguishing one component from another component. For example, without departing from the scope of the present invention, a first component may be referred to as a second component, and similarly, a second component may also be referred to as a first component. Unless the context clearly dictates otherwise, the singular form includes the plural form.

It should be understood that the terms "comprise," "include," and "have" specify the presence of stated herein features, numbers, steps, operations, components, elements, or combinations thereof, but do not preclude the presence or possibility of adding one or more other features, numbers, steps, operations, components, elements, or combinations thereof. In addition, when a portion of a layer, a film, a region, a plate, or the like is referred to as being "on" other portion, this includes not only a case in which the portion is "directly on" the other portion but also a case in which another portion is present between the portion and the other portion. Conversely, when a portion of a layer, a film, a region, a plate, or the like is referred to as being "under" other portion, this includes not only a case in which the portion is "directly under" the other portion but also a case in which another portion is present between the portion and the other portion.

Figure 1A:
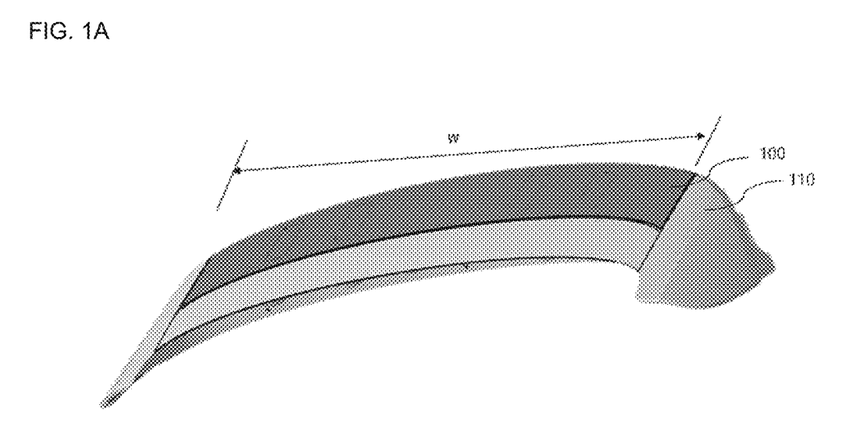
FIG. 1A is a schematic diagram illustrating a state in which a vehicle spoiler is installed in a vehicle trunk according to the present disclosure.
Figure 1B:
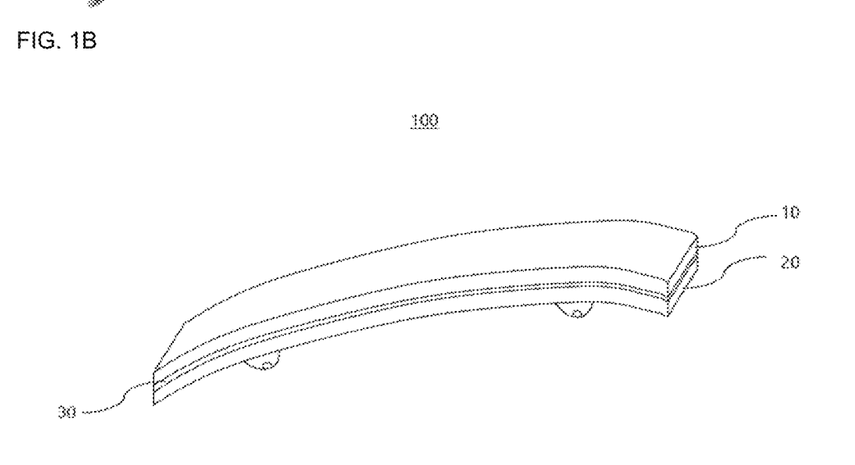
FIG. 1B is a schematic diagram illustrating an appearance of the vehicle spoiler according to the present disclosure.

The present disclosure relates to a vehicle spoiler. Hereinafter, the present disclosure will be described in detail with reference to the accompanying drawings. Here, FIG. 1A is a schematic diagram illustrating a state in which a vehicle spoiler is installed in a vehicle trunk according to the present disclosure. FIG. 1B is a schematic diagram illustrating an appearance of the vehicle spoiler. In addition, FIG. 2 is a schematic upper side view illustrating a fixing member according to the present disclosure.

Figure 2:
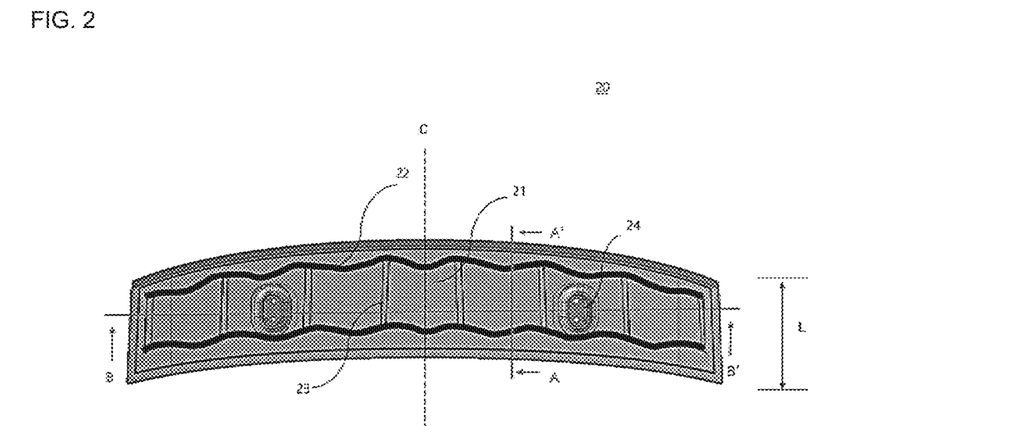
FIG. 2 is a schematic upper side view illustrating a fixing member according to the present disclosure.

Referring to FIGS. 1A, 1B, and 2, a configuration of a vehicle spoiler 100 according to the present disclosure will be described in more detail as follows.

The vehicle spoiler 100 according to the present disclosure includes a spoiler body 10 installed on a vehicle trunk 110 in a width direction W and formed in the form of a plate, a fixing member 20 including an adhesive surface 21 which is vertically coupled to a lower surface of the spoiler body 10 and of which one surface is surface-treated, and a protrusion 22 formed to protrude in a predetermined height in a vertical direction of the adhesive surface 21, and an adhesive 30 applied to the adhesive surface 21 of the fixing member 20.

First, as shown in FIG. 1A, the vehicle spoiler 100 according to the present disclosure may be installed in the vehicle trunk 110 in a width direction W. Specifically, the vehicle spoiler 100 may be installed in the form extending in the width direction W of a trunk lid at a rear side of the vehicle. The vehicle spoiler 100 according to the present disclosure is applied as a variable spoiler, and when necessary, the spoiler 100 is drawn out from a rear trunk of the vehicle, and when unnecessary, the spoiler 100 is stored in the rear trunk of the vehicle.

As shown in FIG. 1B, the vehicle spoiler 100 may be in a state in which the spoiler body 10 and the fixing member 20 are coupled. Specifically, the vehicle spoiler 100 is formed such that a lower surface of the spoiler body 10 and an upper surface of the fixing member 20 are coupled through the adhesive 30.

The spoiler body 10 may have a curved plate shape of which height is gradually lowered toward both sides from a central axis. The spoiler body 10 may be manufactured by molding and may maintain a predetermined strength and a predetermined shape, but the present disclosure is not limited thereto. The spoiler body 10 may have a shape corresponding to an adhesive surface 21 of the fixing member 20, which will be described below.

A material having predetermined strength may be used as a material of the spoiler body 10. Specifically, a sheet molding compound (SMC) material with excellent rigidity and excellent strength may be used as a material of the spoiler body 10, but the present disclosure is not limited thereto.

The fixing member 20 may include the adhesive surface 21 and a protrusion. 22.

The fixing member 20 may have a curved plate shape of which height is gradually lowered toward both sides from a central axis C.

Accordingly, the fixing member 20 may have a form in which a height of a central portion is higher than heights of both ends in an upper direction.

The adhesive surface 21 is a surface corresponding to the upper surface of the fixing member 20. The adhesive surface 21 is a surface coupled to a lower surface of the spoiler body 10.

The adhesive surface 21 may be surface-treated in an embo shape. In the present disclosure, the embo shape means a plurality of uneven protrusions. The embo shape may be formed by pressing of a corroded mold.

The embo shape may have a three-dimensional shape having a cross section of a semicircle, trapezoid, or triangle.

The protrusion 22 may be formed to protrude from an edge of the adhesive surface 21. The protrusion 22 may protrude in a continuously curved shape.

By applying a continuously curved structure to the protrusion 22, the vehicle spoiler 100 according to the present disclosure may increase a length thereof bonded to the spoiler body 10 when compared to the existing linear shape, thereby improving adhesive performance.

Figure 3A:
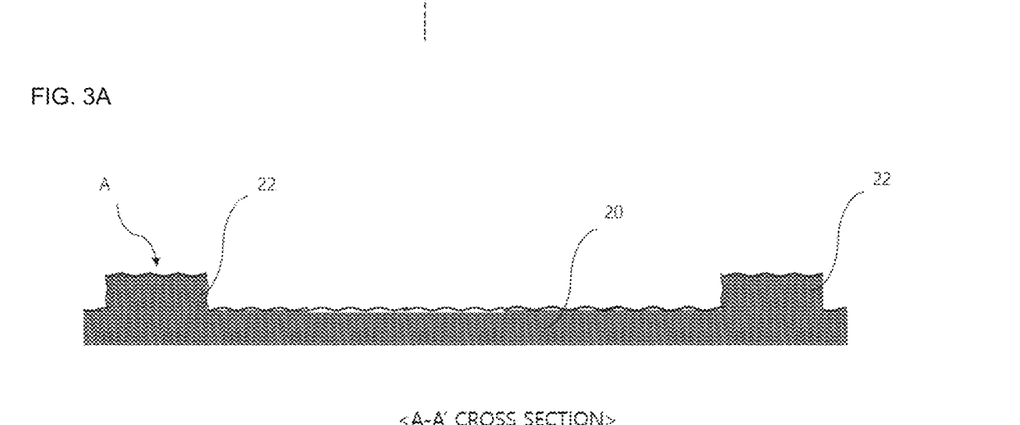
FIG. 3A is a schematic cross-sectional view illustrating the fixing member of FIG. 2.

FIG. 3A is a schematic cross-sectional view illustrating the fixing member. Specifically, FIG. 3A shows a cross section of a portion corresponding to line A-A' of FIG. 2.

Referring to FIG. 3A, the adhesive surface 21 may be surface-treated in an embo shape A to increase an adhesive area between the fixing member 20 and the spoiler body 10, thereby improving adhesive performance.

Figure 3B:
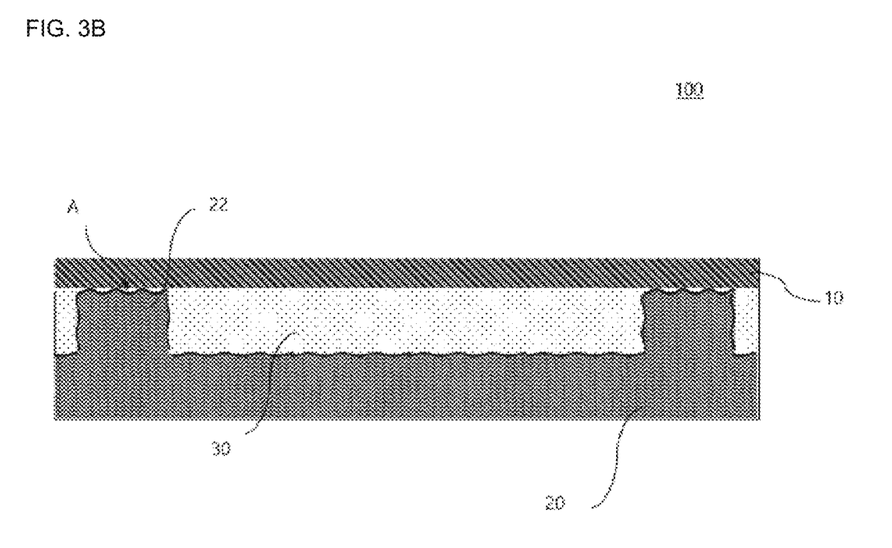
FIG. 3B is a schematic cross-sectional view illustrating the vehicle spoiler of FIG. 2.

FIG. 3B is a schematic cross-sectional view illustrating the vehicle spoiler. Specifically, FIG. 3B shows a cross section of a portion corresponding to line A-A' of FIG. 2.

Referring to FIG. 3B, the protrusion 22 is formed to protrude at a predetermined height in the vertical direction of the adhesive surface 21 and may serve as an adhesive guide for preventing the applied adhesive 30 from overflowing out of the adhesive surface 21. In this case, the protrusion 22 may have a protruding height ranging from 0.4 mm to 0.8 mm.

In addition, when the fixing member 20 and the spoiler body 10 are coupled, the protrusion 22 may allow the adhesive 30 to be applied to the surface of the fixing member 20 to have a uniform thickness and, simultaneously, prevent a partial pressing phenomenon in which a portion is pressed.

As shown in FIG. 2, the fixing member 20 may further include a groove 23 and a bracket connector 24.

Figure 4:
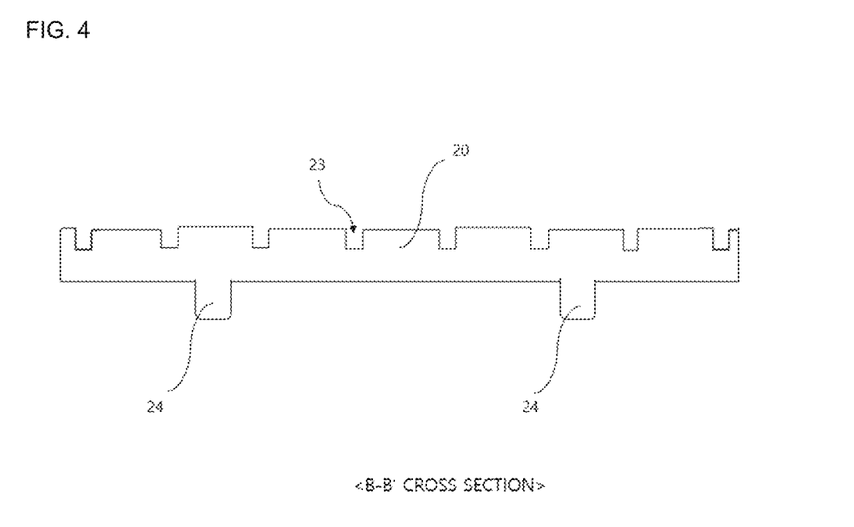
FIG. 4 is a schematic cross-sectional view illustrating the fixing member of FIG.

FIG. 4 is a schematic cross-sectional view illustrating the fixing member. Specifically, FIG. 4 shows a cross section of a portion corresponding to line B-B' of FIG. 2.

Referring to FIG. 4, the groove 23 may be formed to be recessed by extending at a predetermined depth in a length direction L of the adhesive surface 21. A plurality of grooves 23 may be formed in the fixing member 20 at regular intervals. In this case, the recessed length of the groove 23 may range from 0.5 mm to 1.0 mm.

The groove 23 is a space where an appropriate amount of the adhesive 30 is applied to the adhesive surface 21 and an excess adhesive 30 flows out. In this case, it is necessary to calculate an overflow amount so that the adhesive 30 may be applied to the surface of the protrusion 22.

The bracket connector 24 is vertically fixed to the lower surface of the spoiler body 10 and serves to fix the spoiler body 10 while spacing the spoiler body 10 apart from an upper surface of a lid of the vehicle trunk 110 by a predetermined distance.

A pair of the bracket connectors 24 may be formed to be recessed by extending in the length direction L of the adhesive surface 21. A plurality of bracket connectors 24 may be formed in the fixing member 20 at regular intervals.

The bracket connector 24 may be symmetrically positioned with the fixing member 20, and a bracket groove for coupling to the vehicle may be formed.

Referring to FIG. 3B, the adhesive 30 may be applied at the height of the protrusion 22 of the fixing member 20. The adhesive 30 may include at least one selected from the group consisting of polyurethane, epoxy, and a combination thereof.

In another aspect, the present disclosure relates to a method of manufacturing a vehicle spoiler. In the manufacturing method, a detailed description of the components related to the spoiler body 10, the fixing member 20, and the adhesive 30, which are the same components as those described above in the vehicle spoiler 100, will be omitted herein.

Figure 5:
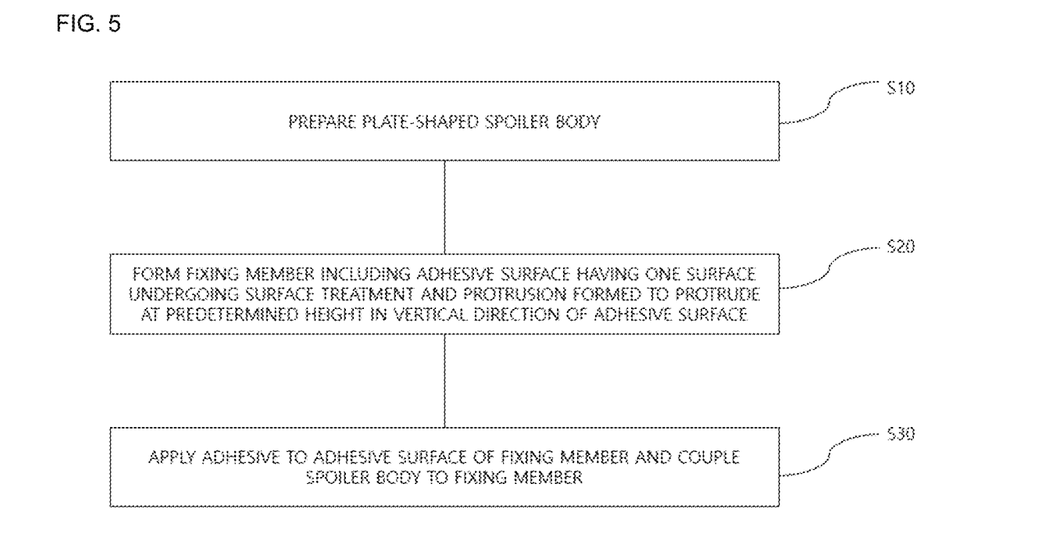
FIG. 5 is a flowchart illustrating a method of manufacturing a vehicle spoiler according to the present disclosure.

FIG. 5 is a flowchart illustrating a method of manufacturing a vehicle spoiler according to the present disclosure. Referring to FIG. 5, the method of manufacturing a vehicle spoiler according to the present disclosure includes preparing a plate-shaped spoiler body installed in a vehicle trunk in a width direction (S10), forming a fixing member which is coupled to a lower surface of the spoiler body in a vertical direction and which includes an adhesive surface having one surface undergoing surface treatment and a protrusion formed to protrude at a predetermined height in a vertical direction of the adhesive surface (S20), and applying an adhesive to the adhesive surface of the fixing member and coupling the spoiler body to the fixing member (S30).

Each operation of the method of manufacturing a vehicle spoiler according to the present disclosure will be described in detail as follows.

First, in S10, the plate-shaped spoiler body is prepared. The spoiler body may be manufactured by molding and may maintain a predetermined strength and a predetermined shape, but the present disclosure is not limited thereto. The spoiler body may have a shape corresponding to the adhesive surface of the fixing member, which will be described below.

Subsequently, in S20, the fixing member is manufactured using a mold made of a molding material. In this case, a sheet molding compound (SMC) material having excellent rigidity and excellent strength may be used as the molding material.

In the present disclosure, the molding material may be cut to a predetermined weight and supplied to a mold assembly. A weight of the molding material may range 0.92 to 0.95 kg. When the weight of the molding material is less than 0.92 kg, it may be a cause of non-molding, and when the weight of the molding material exceeds 0.95 kg, the mold may not be closed to cause dimensional instability of a product. In addition, when the weight of the molding material exceeds 0.95 kg, problems such as product jamming in the mold, demolding, and excessive burr generation of the product occur.

The mold molding used in the present disclosure is press molding performed by a mold assembly, and the mold assembly includes a base mold, a lower mold seated on the base mold, and an upper mold matching in shape of the lower mold.

Here, the molding material is supplied between the upper mold and the lower mold, and molding of the fixing member may be performed by pressing at a specific pressure for a specific period of time in a state in which the upper mold is moved down.

Specifically, in S20, the molding material may be positioned on the lower mold. Before the positioning of the molding material on the lower mold, a release treatment process of applying a release agent to the lower mold and the upper mold may be additionally performed.

Subsequently, the fixing member may be molded by pressing the molding material using the upper mold. In this case, in order to secure extractability and surface smoothness of the molded product, S20 may be performed by setting a temperature of the upper mold to a value in the range of 147° C. to 153° C. and a temperature of the lower mold to a value in the range of 132° C. to 138° C. More preferably, S20 may be performed by setting a temperature of the upper mold to 150° C. and a temperature of the lower mold to 135° C.

When the temperatures of the upper mold and the lower mold are less than the above ranges, degradation of fluidity of the molding material and a delay in curing become a cause of non-molding of a product. In addition, when the temperatures of the upper mold and the lower mold exceed the above ranges, the molding material is rapidly cured to become a cause of non-molding, and a browning phenomenon in which a color of the material changes after molding and degradation of a physical property of the product itself may occur.

In addition, when the temperatures of the upper mold and the lower mold are out of the above ranges, a problem in which the mold is not closed or opened due to expansion of a material of the mold according to the temperature may occur, and thus it is impossible to mold the product having accurate dimensions.

In addition, S20 may be performed for three to five minutes under a pressure ranging from 650 to 750 tons. When the press pressure is less than 650 tons, the mold is not completely closed, becoming a cause of non-molding of the material and dimensional instability of the product.

On the other hand, when the press pressure exceeds 750 tons, a problem may occur in durability of the mold due to the pressure being higher than and equal to a reference pressure.

In addition, when the molding time is less than three minutes, the material is demolded in a state of being not completely cured, and then defects such as dimensional instability due to post-deformation and swelling due to post-curing may occur. On the other hand, when the molding time exceeds five minutes, more heat than the reference is applied to the material so that durability of the product may be degraded.

The fixing member molded in S20 is vertically coupled to the lower surface of the spoiler body and may include an adhesive surface having one surface that is surface-treated, a protrusion formed to protrude at a predetermined height in a vertical direction of the adhesive surface, a groove formed to be recessed by extending in a length direction of the adhesive surface, and a pair of bracket connectors formed to be recessed by extending in the length direction of the adhesive surface. Specifically, the fixing member may have a curved plate shape of which height is gradually lowered toward both sides from a central axis. The protrusion may be formed to protrude from an edge of the adhesive surface in a continuously curved shape. Therefore, the lower mold used in the molding of the present disclosure may be a mold capable of molding the shape of the fixing member.

In addition, the lower mold used in the molding of the present disclosure may be a surface-corroded mold. Specifically, the lower mold is to form an embo pattern on the adhesive surface of the fixing member and may be a mold of which surface is corroded using a conventional corrosion method.

In addition, according to the present disclosure, in S20, the surface of the molding material may be surface-treated in an embo shape using the corroded lower mold. In the present disclosure, the embo shape means a plurality of uneven protrusions.

Therefore, in the method of manufacturing a vehicle spoiler according to the present disclosure, the adhesive surface of the fixing member is treated in an embo shape through surface corrosion of the mold so that an adhesive area between the fixing member and the spoiler body may be increased to improve adhesive performance.

In addition, in S20, a post-process such as removing and polishing burrs may be additionally performed by demolding the fixing member which has been molded.

Finally, in S30, the adhesive is applied to the adhesive surface of the fixing member and the spoiler body is coupled to the fixing member so that the vehicle spoiler is manufactured.

In S30, the adhesive may be applied at a height of the protrusion.

Therefore, in accordance with the method of manufacturing a vehicle spoiler according to the present disclosure, when the fixing member and the spoiler body are coupled, the thickness of the adhesive applied to the surface of the fixing member may be uniformly applied and, simultaneously, a partially pressed phenomenon can be prevented.

Hereinafter, the present disclosure will be described in more detail through specific examples. The following examples are merely illustrative to aid understanding of the present disclosure, and the scope of the present disclosure is not limited by the following examples.

Experimental Example 1: Surface Treatment of Adhesive Surface

First, in order to check whether the adhesive strength is improved according to the surface treatment of the adhesive surface, specimens (adherend 1) according to Comparative Examples and Examples were prepared by a surface treatment method shown in the following table 1.

Figure 6:
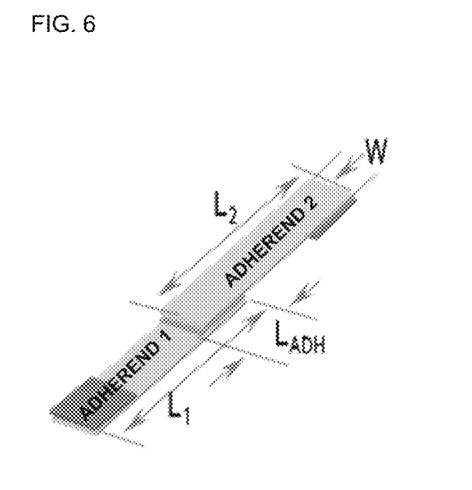
FIG. 6 is a schematic diagram illustrating a state in which shearing strength of a surface-treated adhesive surface is evaluated.

Subsequently, as shown in FIG. 6, evaluation of shearing strength was performed at an experiment speed of 2 mm/min on the basis of ASTM D 5868 (Single Lap-Shear Test), and specific conditions were as follows. Here, FIG. 6 is a schematic diagram illustrating a state in which shearing strength of a surface-treated adhesive surface is evaluated. In addition, characteristics of the surface area and the shearing strength for each specimen are shown in Table 1.

[Experimental Condition of Shearing Strength]

$L_1$=100 mm, $L_2$=100 mm, $L_{ADH}$=12.5 mm, and W=25 mm adherend 1=GF-SMC 2.0 mm, and adherend 2=CF-SMC 2.0 mm adhesive=polyurethane or epoxy two-component structural adhesive adhesive thickness=0.25 mm curing condition: fixture Cure=135° C./3 min, and post cure=149° C./30 min attaching tabs for specimen alignment during experiment

TABLE 1

| | Comparative Example 1 | Comparative Example 2 | Comparative Example 3 | Example 1 |
| --- | --- | --- | --- | --- |
| Surface treatment | Not reflected | Removal of surface foreign materials using isopropyl alcohol (IPA) | Sanding treatment | Embo treatment using corroded mold |

TABLE 1-continued

| | Comparative Example 1 | Comparative Example 2 | Comparative Example 3 | Example 1 |
| --- | --- | --- | --- | --- |
| Surface area | No change | No change | Increase in surface area | Increase in surface area |
| Shearing strength (MPa) | 3.98 | 4.57 | 8.97 | 8.08 |

Referring to Table 1, in Comparative Example 2, foreign materials, such as dust, oil, and sealant, present on the adhesive surface were removed by cleaning a surface of the specimen using IPA so that it can be seen that the adhesive strength was improved about 15% (3.98 MPa→4.59 MPa) when compared to Comparative Example 1 without surface treatment.

Figure 7A:
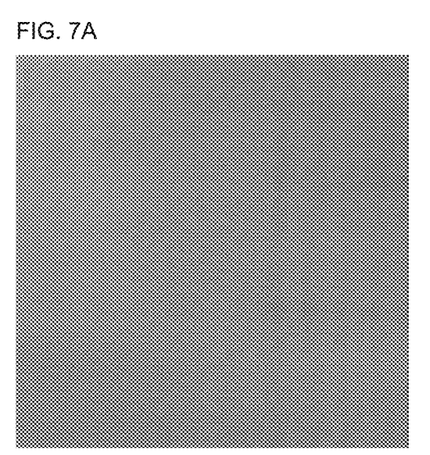
FIG. 7A is a diagram illustrating a surface-treated adhesive surface according to a Comparative Example.

FIG. 7A is a diagram illustrating a surface-treated adhesive surface according to Comparative Example 2. In Comparative Example 3, as shown in FIG. 7A, the surface area of the adhesive surface may be increased by sanding the surface of the specimen. Specifically, it can be seen that, as the measurement result of the shearing strength, the shearing strength of Comparative Example 3 was improved about 125% (3.98 MPa→8.97 MPa) when compared to Comparative Example 1 without surface treatment.

However, when the sanding treatment is performed as in Comparative Example 2, reproducibility is not good, and a sanding process is added to the existing process to become a cause of an increase in production cost.

Figure 7B:
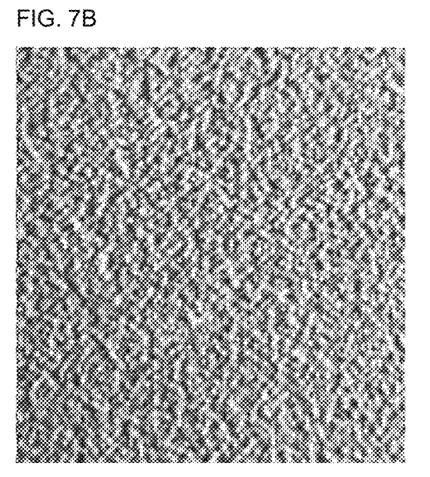
FIG. 7B is a diagram illustrating a surface-treated adhesive surface according to an Example.

On the other hand, FIG. 7B is a diagram illustrating a surface-treated adhesive surface according to Example 1. In the case of Example 1, as shown in FIG. 7B, by surface-treating the surface of the specimen in an embo shape using the corroded mold, the surface area of the adhesive surface may be increased similar to the sanding treatment. Specifically, it can be seen that, as the measurement result of the shearing strength, the shearing strength of Example 1 was improved about 103% (3.98 MPa→8.08 MPa) when compared to Comparative Example 1 without surface treatment.

Therefore, when the embo treatment is applied using the mold, since the embo treatment is applied by being reflected to the existing mold, a separate additional process is unnecessary and it is very advantageous for securing reproducibility.

Experimental Example 2: Change of Protrusion Shape

Figure 8:
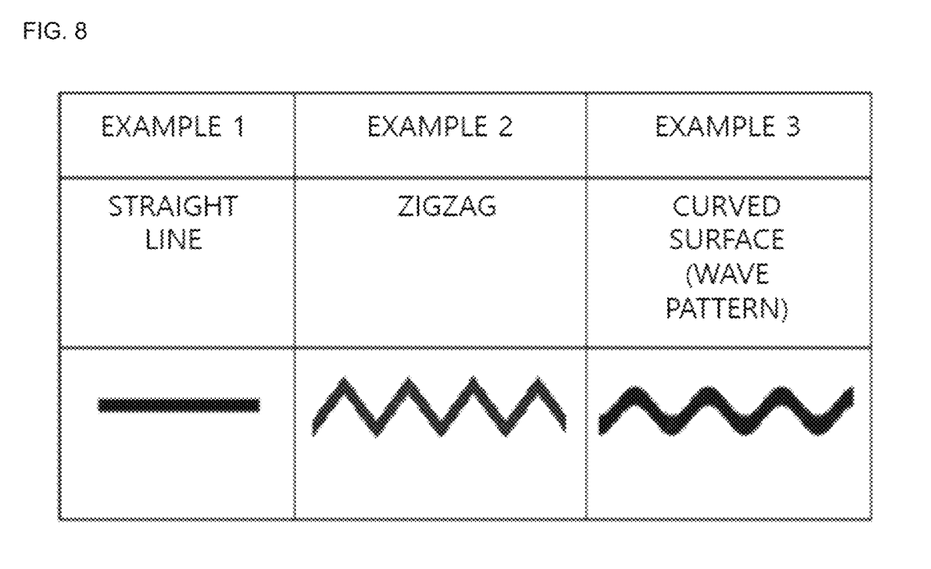
FIG. 8 is an upper side view illustrating a protruding shape according to the Example.

Subsequently, in order to further improve the adhesive strength of the specimen (adherend 1) surface-treated in an embo shape and another specimen (adherend 2), by changing the shape of the specimen (adherend 1) manufactured in Example 1 to shapes shown in the following Table 2, it was checked whether the adhesive strength was improved. In this case, the adhesive strength was evaluated in the same manner as in Experimental Example 1 to evaluate the shearing strength. Specifically, a protruding shape of the specimen (adherend 1) is as shown in FIG. 8. Here, FIG. 8 is an upper side view illustrating a protruding shape according to Examples.

TABLE 2

|  | Example 1 | Example 2 | Example 3 |
|---|---|---|---|
| Specimen (adherend 1) Shape | Straight line | Zigzag | Curved surface (wave pattern) |
| Adhesive strength | — | Increase in adhesive strength | Increase in adhesive strength |
| Applied amount of adhesive | Small | Large | Medium |

Referring to Table 2 and FIG. 8, it was confirmed that the specimen (adherend 1) in the form of a straight-line shape according to Example 1 could reduce a consumption amount of the adhesive when compared to Examples 2 and 3.

In addition, it was confirmed that the adhesive strength of the specimen (adherend 1) according to Examples 2 and 3 was improved as a length of an area bonded to the specimen (adherend 2) increased as compared to Example 1 formed in a straight-line shape.

In addition, although the adhesive strength of the specimen (adherend 1) according to Example 2 was increased due to an increase in length of the area to be bonded, a problem was that the adhesive was excessively applied to a vertex portion due to a direction change when the adhesive was applied by a robot.

Therefore, in Example 3 in the form of a curved (wave pattern) shape, similar to a zigzag shape, it was confirmed that the adhesive strength was increased due to an increase in length of the area to be bonded so that a quantitative adhesive application by the robot was possible. Therefore, the specimen (adherend 1) according to Example 3 was formed to have a curved surface (wave pattern) so that the adhesive could be applied in an optimal amount and the adhesive strength could be maximally improved.

In accordance with a vehicle spoiler according to the present disclosure, a surface of a fixing member bonded to a spoiler body is embo-treated through surface corrosion of a mold so that adhesion performance can be increased by increasing a bonding area between the fixing member and the spoiler body.

In addition, in accordance with the vehicle spoiler according to the present disclosure, a protrusion serving as an adhesive guide is formed on the adhesive surface of the fixing member so that, when the fixing member and the spoiler body are coupled, a thickness of an adhesive applied to a surface of the fixing member can be uniformly applied and, simultaneously, a partially pressed phenomenon can be prevented.

In addition, in accordance with the vehicle spoiler according to the present disclosure, by applying a continuously curved structure to the protrusion, it is possible to increase a length thereof bonded to the spoiler body when compared to the existing linear shape, thereby contributing to improvement of the adhesion performance of the surface-treated adhesive surface.

The effects of the present disclosure are not limited to the above-described effects. It should be understood that the effects of the present disclosure include all effects which can be inferred from the above description.

While the embodiments of the present disclosure have been described, those skilled in the art can understand that the present disclosure can be implemented in other specific forms without departing from the technical spirit or the necessary features of the present disclosure. Therefore, it should be understood that the above-described embodiments are not restrictive but illustrative in all aspects.

What is claimed is:

1. A vehicle spoiler, comprising:
 a spoiler body installed in a vehicle trunk in a width direction and formed in a plate shape;
 a fixing member which is coupled to a lower surface of the spoiler body in a vertical direction and which comprises an adhesive surface having one surface undergoing surface treatment and a protrusion formed to protrude at a predetermined height in a vertical direction from the adhesive surface; and
 an adhesive applied to the adhesive surface of the fixing member;
 wherein the adhesive surface is surface-treated in an embo shape.

2. The vehicle spoiler of claim 1, wherein the fixing member has a curved plate shape of which height is gradually lowered toward both sides from a central axis.

3. The vehicle spoiler of claim 1, wherein the protrusion is formed to protrude from an edge of the adhesive surface to prevent the applied adhesive from overflowing from the adhesive surface.

4. The vehicle spoiler of claim 1, wherein the protrusion protrudes in a continuously curved shape.

5. The vehicle spoiler of claim 1, wherein a protruding height of the protrusion ranges from 0.4 mm to 0.8 mm.

6. The vehicle spoiler of claim 1, wherein the fixing member further comprises a groove,
 wherein the groove is formed by being recessed in the longitudinal direction from the adhesive surface.

7. The vehicle spoiler of claim 1, wherein the fixing member further comprises a pair of bracket connectors,
 wherein the bracket connectors is formed by being protruded in the longitudinal direction from the adhesive surface.

8. The vehicle spoiler of claim 1, wherein the adhesive is applied at a height of the protrusion.

9. The vehicle spoiler of claim 1, wherein the adhesive comprises at least one selected from the group consisting of polyurethane, epoxy, and a combination thereof.

10. A method of manufacturing the vehicle spoiler according to claim 1, the method comprising:
 preparing a spoiler body installed in a vehicle trunk in a width direction and formed in a plate shape;
 forming a fixing member which is coupled to a lower surface of the spoiler body in a vertical direction and which comprises an adhesive surface having one surface undergoing surface treatment and a protrusion formed to protrude at a predetermined height in a vertical direction of the adhesive surface, wherein the forming of the fixing member comprises:
  placing a molding material on a corroded lower mold; and
  pressing the molding material using an upper mold; and
 applying an adhesive to the adhesive surface of the fixing member and coupling the spoiler body to the fixing member.

11. The method of claim 10, wherein the forming of the fixing member is performed such that a temperature of the upper mold is set to a value in the range of 147° C. to 153° C., and a temperature of the lower mold is set to a value in the range of 132° C. to 138° C.

12. The method of claim 10, wherein the forming of the fixing member is performed under a pressure for three to five minutes.

13. The method of claim 10, wherein the forming of the fixing member uses the molding material having a weight in the range of 0.92 to 0.95 kg.

14. The method of claim 10, wherein, in the forming of the fixing member, the adhesive surface of the molding material is surface-treated in an emboss shape using a corroded lower mold.

15. The method of claim 10, wherein, in the coupling of the spoiler body to the fixing member, the adhesive is applied at a height of the protrusion.

* * * * *